(12) United States Patent
Chen et al.

(10) Patent No.: US 7,067,183 B2
(45) Date of Patent: Jun. 27, 2006

(54) WRITE ONCE RECORDING MEDIUM

(75) Inventors: Bing-Mau Chen, Nantou (TW); Hung-Fa Chen, Taipei (TW); Li-Chun Chung, Chia-I (TW)

(73) Assignee: Ritek Corporation, Hsinchu (TW)

( * ) Notice: Subject to any disclaimer, the term of this patent is extended or adjusted under 35 U.S.C. 154(b) by 93 days.

(21) Appl. No.: 10/709,168

(22) Filed: Apr. 19, 2004

(65) Prior Publication Data
US 2004/0241376 A1    Dec. 2, 2004

(30) Foreign Application Priority Data
May 26, 2003   (TW) ............................... 92114124 A

(51) Int. Cl.
*B32B 3/02* (2006.01)
(52) U.S. Cl. ............. 428/64.1; 428/64.4; 428/64.5; 430/270.12; 430/270.13
(58) Field of Classification Search .............. 428/64.5; 430/270.13
See application file for complete search history.

(56) References Cited

U.S. PATENT DOCUMENTS

| 4,477,819 A | 10/1984 | Lee et al. ................. 346/76 L |
| 4,624,914 A | 11/1986 | Kimura et al. ............. 430/495 |
| 4,960,680 A | 10/1990 | Pan et al. ................... 430/346 |
| 5,401,609 A | 3/1995 | Haratani et al. ............ 430/270 |
| 5,458,941 A | 10/1995 | Hintz ........................ 428/64.4 |
| 6,929,849 B1* | 8/2005 | Koskenmaki et al. ....... 428/209 |
| 2003/0190551 A1* | 10/2003 | Aoshima et al. ....... 430/270.12 |
| 2003/0202452 A1* | 10/2003 | Mishima et al. ....... 369/112.23 |
| 2003/0223351 A1* | 12/2003 | Aoshima et al. ............ 369/288 |
| 2003/0231577 A1* | 12/2003 | Mishima et al. ............ 369/283 |
| 2004/0190435 A1* | 9/2004 | Hosoda et al. .............. 369/283 |

\* cited by examiner

*Primary Examiner*—Elizabeth Mulvaney
(74) *Attorney, Agent, or Firm*—Jiang Chyun IP Office

(57) ABSTRACT

A write once recording medium comprising an inorganic material serving as a recording layer is disclosed. The inorganic material has a formula, $A_{(1-y)}M_y$, wherein A is comprised of Si or Sn; M is comprised of Al, Ag, Au, Zn, Ti, Ni, Cu, Co, Ta, Fe, W, Cr, V, Ga, Pb, Mo, In or Te; and y is in the range of 0.02~0.8.

17 Claims, 6 Drawing Sheets

WRITE ONCE RECORDING MEDIUM

CROSS REFERENCE TO RELATED APPLICATIONS

This application claims the priority benefit of Taiwan application serial no. 92114124, filed May 26, 2003.

BACKGROUND OF INVENTION

1. Field of the Invention

The present invention generally relates to a recording medium. More particularly, the present invention relates to a write once recording medium.

2. Description of the Related Art

With the development of the internet and ever increased capacity of computers, more diversified information can be obtained and transferred. The capacity of computers for handling information has gradually evolved from mere data processing in the earlier stage to processing of words, graphs, sounds, static pictures, and to today's processing of high resolution motion pictures. The recording media for storing such information have also evolved from paper in the earlier stage, to magnetic tape and hard disc, and further to today's optical information recording media such as compact disc (CD) and digital versatile disc (DVD).

Optical information recording media have been rapidly brought up to the market due to their advantages of high recording density, small size, long storing period, low manufacturing costs, high compatibility and low error rate in comparison with magnetic tapes and semiconductor memory cells. Among various types of the optical information recording media, the most widely used is write once recording medium (WORM), such as compact disc-recordable (CD-R) and digital versatile disc recordable (DVD-R). In the WORM, organic dye is used to form a recording layer and the information is recorded via deformation of a substrate of the medium induced by structural changes of the organic dye layer under irradiation of a laser beam.

In the foregoing WORM, the organic dyes, which is used as the recording layer, have disadvantages such as high manufacturing costs, difficulty in formulation, complicity of solvent system, sensitivity to laser wavelength, low tolerance to climate (temperature and humidity), short life time and pollution to the environment. Additionally, with respect to the next generation of blue OLE_LINK1laserOLE_LINK1 optical information recording medium, which uses short wavelength (405 nm) blue laser for recording and regenerating, fewer types of organic dyes can be used and, even if used, the organic dyes are more difficult to be coated on the disc substrate via spin coating due to their lower solubility. Furthermore, as a result of significant changes in the disc structure of blue laser optical information recording medium, track pitch (about 0.3~0.4 μm) on a disc substrate is reduced so that, due to internal tension of organic dye solution, organic dyes cannot be uniformly coated on the disc substrate. Consequently, the coating process can only be performed via evaporation coating, which makes manufacturing processes more difficult.

Therefore, it is desirable to replace organic dyes with inorganic materials as recording layers of WORM. In addition, inorganic materials used as recording layers of WORM can have different material systems corresponding to different writing mechanisms. For example, a prior art (U.S. Pat. No. 5,401,609) discloses a recording method via gas expansion, and the materials used therein are $AgO_x$, $FeN_x$, $CuN_x$, and $SnN_x$. Another prior art (U.S. Pat. No. 4,624,914) discloses formation of recorded marks via structural change by using a mixture of metal and metal oxide. Yet other prior arts (U.S. Pat. No. 4,477,819 and U.S. Pat. No. 5,458,941) disclose formation of recorded marks via interface reaction, and the materials therein are Ge/Al, Si/Al, Al—Cr/Si—Al, and GaSb/Ag. Further, a prior art (U.S. Pat. No. 4,960,680) discloses the formation of recorded marks via irreversible phase change, and the materials therein include Sb—In—Sn and Sn—Sb—Se/Sb—Bi. Comparing to the WORM with organic dyes as recording layers, the WORM with inorganic materials as recording layers has advantages such as simplicity in formation, low pollution to the environment, high light-resistance and high climate-resistance. Thus, the WORM with inorganic materials as recording layers has become the focus of research and development of future recording media.

SUMMARY OF INVENTION

In view of the foregoing, the present invention is to provide a WORM, wherein an inorganic material is used as a recording layer and laser with a variety of wavelengths can be used for recording and regenerating.

Another object of the present invention is to provide a WORM with advantages including simplicity in formation, low pollution to the environment, high light-resistance, and high climate-resistance.

In accordance with the above objects and other advantages of the present invention, as embodied and broadly described herein, a WORM is provided. The WORM comprises a substrate, a first protective layer on the substrate, an inorganic recording layer on the first protective layer, a second protective layer on the inorganic recording layer, and a reflective layer on the second protective layer. The inorganic recording layer, upon heating via irradiation of a laser beam, is induced for undergoing a local reaction and heat absorption to form a recorded mark with distinctive reflectivity. The inorganic recording layer is made of, for example, a material having a formula I: $A_{(1-y)}M_y(I)$ wherein A is comprised of a silicon (Si) or a tin (Sn); M is selected from the group consisting of aluminum (Al), silver (Ag), Gold (Au), Znic (Zn), titanium (Ti), nickel (Ni), copper (Cu), cobalt (Co), tantalum (Ta), iron (Fe), tungsten (W), chromium (Cr), vanadium (V), gallium (Ga), lead (Pb), molybdenum (Mo), indium (In), and tellurium (Te); and y is in the range of 0.02 to 0.8.

Examples of materials for forming the first protective layer and the second protective layer are, but not limited to, dielectric materials such as silicon nitride ($SiN_x$), zinc sulfide-sulfur dioxide ($ZnS$—$SiO_2$), aluminum nitride ($AlN_x$), silicon carbide (SiC), germanium nitride ($GeN_x$), titanium nitride ($TiN_x$), tantalum oxide ($TaO_x$), and yttriumoxide ($YO_x$). The first or the second protective layer can be, for example, a single dielectric layer or a complex dielectric layer with two or more dielectric sub-layers. The reflective layer is made of materials such as Au, Ag, Al, Ti, Pb, Cr, Mo, W, Ta, and an alloy of the foregoing metals. The WORM of the present invention can steadily record information and thus is practically useful. In comparison with organic dyes, the inorganic materials as recording layers in the WORM of the present invention have advantages such as applicability in the whole spectrum of the visible light, high compatibility to various types of the media, high recording density, high resolution of recorded marks, applicability to high speed, low material costs, low pollution to the environment, high light-resistance and high climate-resistance.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

FIGS. 1A to 1E are schematic sectional views showing, respectively, a structure of a WORM of the present invention. For simplicity and clarity, identical elements are marked with the same numbers and the descriptions of which are presented only once.

Figure 1A:
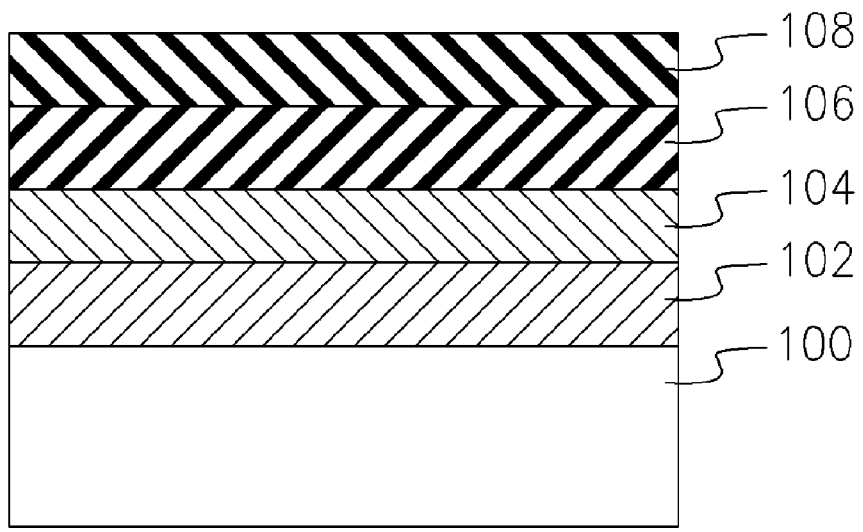
FIGS. 1A to 1E are schematic sectional view showing the structure of a WORM of the present invention.

Referring to FIG. 1A, a disc of the WORM of the present invention comprises a substrate 100, a first protective layer 102, an inorganic recording layer 104, a second protective layer 106, and a reflective layer 108.

The substrate 100 is transparent with grooves on the surface and can be comprised of a substrate of, for example, a CD-R, a DVD-R, a blue laser-R, or a bluelaser WORM. The substrate 100 is comprised of a material including, but not limited to, a glass, a polycarbonate (PC), polymethylmethacrylate (PMMA), or a metallocene catalyzed cyclo olefin copolymer (MCOC).

The first protective layer 102 is formed on the substrate 100 and is comprised of a material including a dielectric material, for example, silicon nitride ($SiN_x$), Zinc sulfides-ulfur dioxide ($ZnS$—$SiO_2$), aluminum nitride ($AlN_x$), silicon carbide (SiC), germanium nitride ($GeN_x$), titanium nitride ($TiN_x$), tantalum oxide ($TaO_x$) or yttriumoxide ($YO_x$). The thickness of the first protective layer 102 is, for example, in the range of 1 nm to 200 nm. The first protective layer 102 can be a single dielectric layer or a complex dielectric layer with two or more dielectric sub-layers.

The inorganic recording layer 104 is formed on the first protective layer 102 and can be made of, for example, a material having a formula I: $A_{(1-y)}M_y$ (I) wherein A can be silicon (Si) or tin (Sn); M can be aluminum (Al), silver (Ag), Gold (Au), Znic (Zn), titanium (Ti), nickel (Ni), copper (Cu), cobalt (Co), tantalum (Ta), iron (Fe), tungsten (W), chromium (Cr), vanadium (V), gallium (Ga), lead (Pb), molybdenum (Mo), indium (In), or Tellurium (Te); and y is in the range of 0.02 to 0.8.

The inorganic recording layer 104 can be made of any one kind or a mixture of two or more kinds of the materials having the formula I. The thickness of the inorganic recording layer 104 is, for example, in the range of 3 nm to 80 nm. The inorganic recording layer 104, upon heating via irradiation of a laser beam, is induced to for undergoing a local reaction and heat absorption to form a recorded mark with distinctive reflectivity.

The second protective layer 106 is formed on the inorganic recording layer 104 and is made of materials including dielectric materials, fir example, silicon nitride ($SiN_x$), Zinc sulfide-sulfur dioxide ($ZnS$—$SiO_2$), aluminum nitride ($AlN_x$), silicon carbide (SiC), germanium nitride ($GeN_x$), titanium nitride ($TiN_x$), tantalum oxide ($TaO_x$), and yttriumoxide ($YO_x$). The thickness of the second protective layer 106 is, for example, in the range of 1 nm to 200 nm. The second protective layer 106 can be, for example, a single dielectric layer or a complex dielectric layer with two or more dielectric sub-layers.

The reflective layer 108 is formed on the second protective layer 106 and is made of a material, for example, Au, Ag, Al, Ti, Pb, Cr, Mo, W, Ta, and alloys of these metals. The thickness of the reflective layer 108 is, for example, in the range of 10 nm to 200 nm.

Figure 1B:
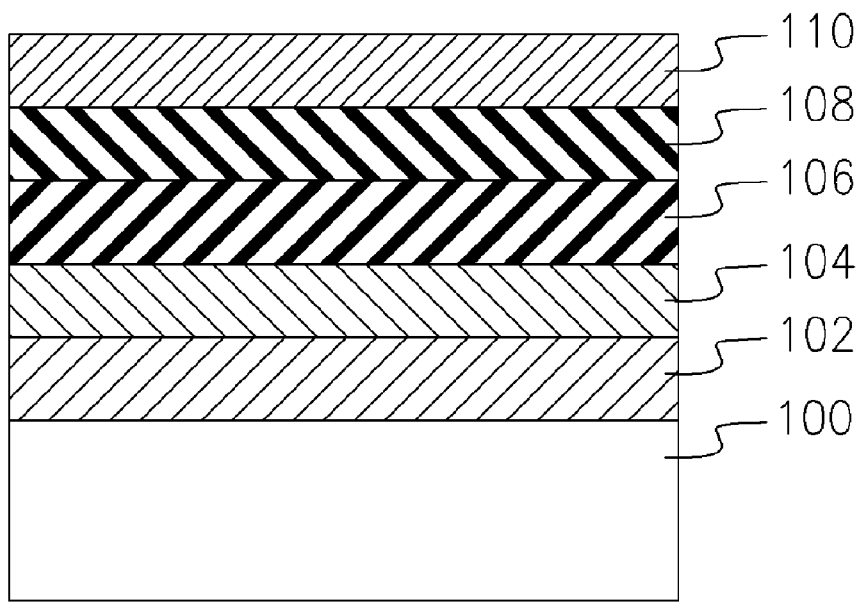

Referring to FIG. 1B, in a disc of the foregoing WORM, a protective resin layer 110 can be formed on the reflective layer 108. The protective resin layer 110 is made of, for example, a photosetting resin to form a disc of recording medium with a structure as shown in FIG. 1B.

Figure 1C:
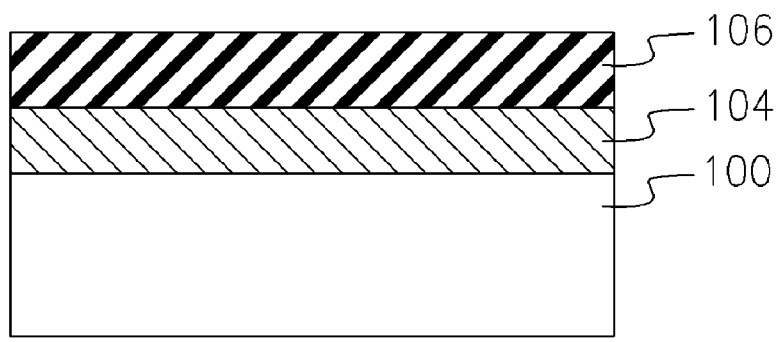
Figure 1D:
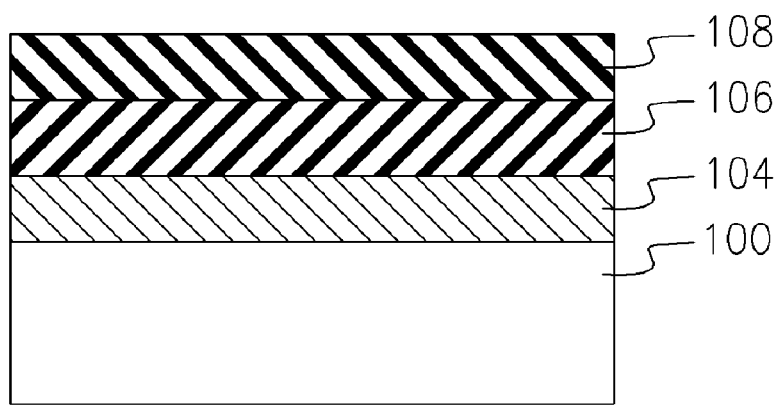
Figure 1E:
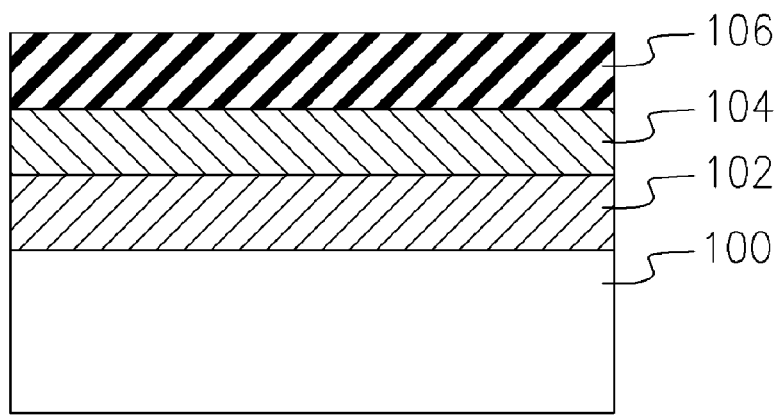

The structure of the WORM of the present invention can be for example, comprised of a substrate 100, an inorganic recording layer 104 and a protective layer 106 as shown in FIG. 1C, or comprised of a substrate 100, an inorganic recording layer 104, a protective layer 106 and a reflective layer 108 as shown in FIG. 1D, or comprised a substrate 100, a first protective layer 102, an inorganic recording layer 104 and a second protective layer 106 as shown in FIG. 1E.

In a recording process of the WORM of the present invention, a laser beam can be used to pass through the substrate 100 and focus on the inorganic recording layer 104, which subsequently causes the inorganic recording layer 104 to absorb heat via a method of pulse high power for forming recorded marks. The recorded marks are formed with reflectivity significantly different from that of nonrecorded marks and such reactions are irreversible. Therefore, via techniques of film design, the inorganic recording layer 104 with such unique characteristics can be used in a WORM.

Moreover, the present invention uses inorganic materials to replace organic materials as recording layers of WORM and, in comparison with the organic dyes, the inorganic materials have advantages such as high light-resistance and high climate-resistance. Thus, the lifetime of the WORM can be extended. In addition, in comparison with the organic dyes, the inorganic materials are less expensive and require no organic solvents, and thus the manufacturing costs can be reduced and the inorganic materials are more environmentally friendly compared to the organic materials. Further, when inorganic materials are used as recording layers, land/groove method for recording can be adopted so that the WORM has high recording density. Therefore, varieties of the foregoing disc structures of the present invention can be applied in CD-R, DVD-R, blue laser R and blue laser WORM.

The foregoing is a description of the structures of the WORM of the present invention, whereas the following is a description of a fabricating method of the WORM according to an embodiment of the present invention based on the structure shown in FIG. 1A.

Figure 2:
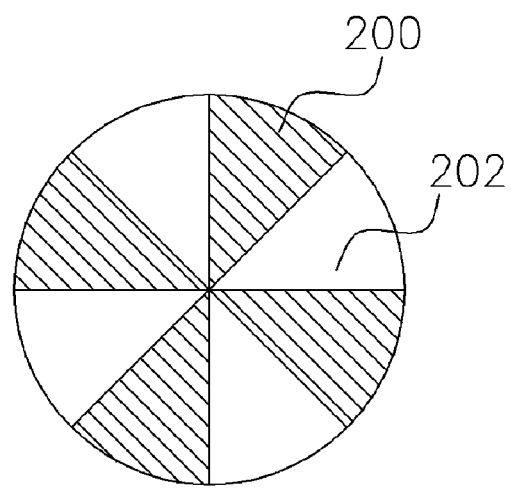
FIG. 2 is a schematic sectional view showing the structure of an apple pie target.

First, a substrate 100 is provided. The substrate 100, for example, can be made of polycarbonate material. A first protective layer 102 is formed on the substrate 100. The first protective layer 102 is formed via a method of, for example, sputtering deposition or coating deposition. Then, an inorganic recording layer 104 is formed on the protective layer 102, and the inorganic recording layer 104 is made of an alloy of $A_{(1-y)}M_y$, as shown in formula I. The inorganic recording layer 104 is formed via a method of, for example, sputtering deposition. In a process of the sputtering deposition, the inorganic recording layer 104 is formed via co-sputtering deposition, wherein a target is formed by charging target materials of element A (A can be Si or Sn) and element M (M can be Al, Ag, Au, Zn, Ti, Ni, Cu, Co, Ta, Fe, W, Cr, V, Ga, Pb, Mo, In, or Te), or a target material of an alloy of element A and element M (alloy target sputtering deposition), or target materials of element A and element M in an alternate arrangement (apple pie target as shown in FIG. 2 where 200 refers element A and 202 refers element M) simultaneously into the sputtering chamber. The ratio of element A and element M in the inorganic recording layer 104 is adjusted according to the composition of the target materials. A second protective layer 106 is then formed on the inorganic recording layer 104 via a method of, for example, sputtering deposition or coating deposition. Consequently, a reflective layer 108 is formed on the protective layer 106 via a method of, for example, sputtering deposition.

In the process of forming the WORM of the present invention, the method of sputtering deposition can be used for forming the protective layers, the recording layer and the reflective layer, and thus the process is relatively simple.

To show special recording properties of the WROM of the present invention, the following is a description of, based on the foregoing method of forming the WROM, the formation of testing discs according to experiments 1 to 3. Dynamic test is performed on the testing discs of experiment 1 and static tests are performed on the testing discs of experiments 1 to 3. It should be noted that the scope of the present invention is not limited by the experiments 1 to 3.

Experiment 1, to form testing discs: A first protective layer (ZnS—SiO$_2$ with a thickness of 30 nm) is formed on a DVD substrate (track pitch of 0.74 μm). An inorganic recording layer (40:60 Al—Si alloy with a thickness of 20 nm) is then formed on the first protective layer via cosputtering deposition. Additionally, a second protective layer (ZnS—SiO$_2$ with a thickness of 30 nm) is formed on the inorganic recording layer. A reflective layer (Al—Ti alloy with a thickness of 100 nm) is then formed on the second protective layer to complete the formation of a testing disc of experiment 1.

Experiment 2, to form testing discs: A first protective layer (ZnS—SiO$_2$ with a thickness of 30 nm) is formed on a DVD substrate (track pitch of 0.74 μm). An inorganic recording layer (35:65 Al—Sn alloy with a thickness of 20 nm) is then formed on the first protective layer via cosputtering deposition. Additionally, a second protective layer (ZnS—SiO$_2$ with a thickness of 30 nm) is formed on the inorganic recording layer to complete the formation of a testing disc of experiment 2.

Experiment 3, to form testing discs: A first protective layer (ZnS—SiO$_2$ with a thickness of 30 nm) is formed on a DVD substrate (track pitch of 0.74 μm). An inorganic recording layer (35:65 Al—Sn alloy with a thickness of 20 nm) is then formed on the first protective layer via cosputtering deposition. Additionally, a second protective layer (ZnS—SiO$_2$ with a thickness of 30 nm) is formed on the inorganic recording layer. A reflective layer (Al—Ti alloy with a thickness of 100 nm) is then formed on the second protective layer to complete the formation of a testing disc of experiment 3.

Figure 3:
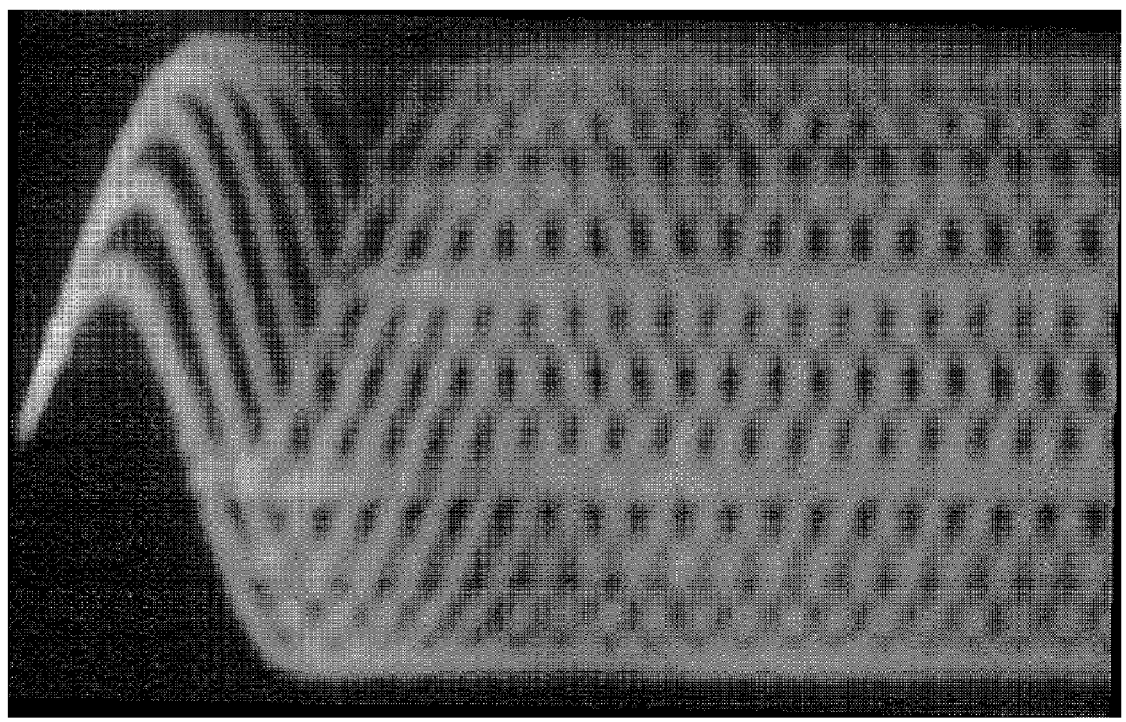
FIG. 3 is a DVD 3T–14T eye pattern of a testing disc according to experiment 1 of the present invention.

Dynamic test: A recording treatment is first performed on a testing disc made according to experiment 1 by using a 2.4-time speed DVD recorder in a writing velocity of 8.7 m/s. A dynamic test is then performed on the testing disc by using a dynamic tester (Model of DDU1000, manufactured by Pulstek). The DVD 3T–14T eye pattern of a testing disc according to experiment 1 is shown in FIG. 3, wherein the Jitter value is about 7.3% which is in conformity with the standard of dynamic writing.

Static test: For monitoring the entire recording process while writing in the recorded marks, static tests are performed on the testing discs according to experiments 1 to, respectively, by using a static tester (Model of Media Test-1, manufactured by Toptica). The static tester is used to write in a recorded mark on the testing disc through a semiconductor laser diode (at the wavelength of 398 nm) in a single-pulse mode, and to monitor the recording process through another semiconductor laser diode (at the wavelength of 422 nm) in a cw mode. In such a process of writing in appropriate recorded marks by using different laser power (mW) and laser pulse (ns), the optical properties of the material are altered with the change of the material itself, and thus the recorded marks have different reflectivity from those of unrecorded marks. The difference in reflectivity is then converted to voltage signals for measuring the transforming time between two phases. The recording process is thus monitored under each writing condition through photography of an electric charge coupling device(CCD). The writing power of the static tester is 12 mV, and the writing pulse width is in the range of 20 ns to 70 ns.

Figure 4A:
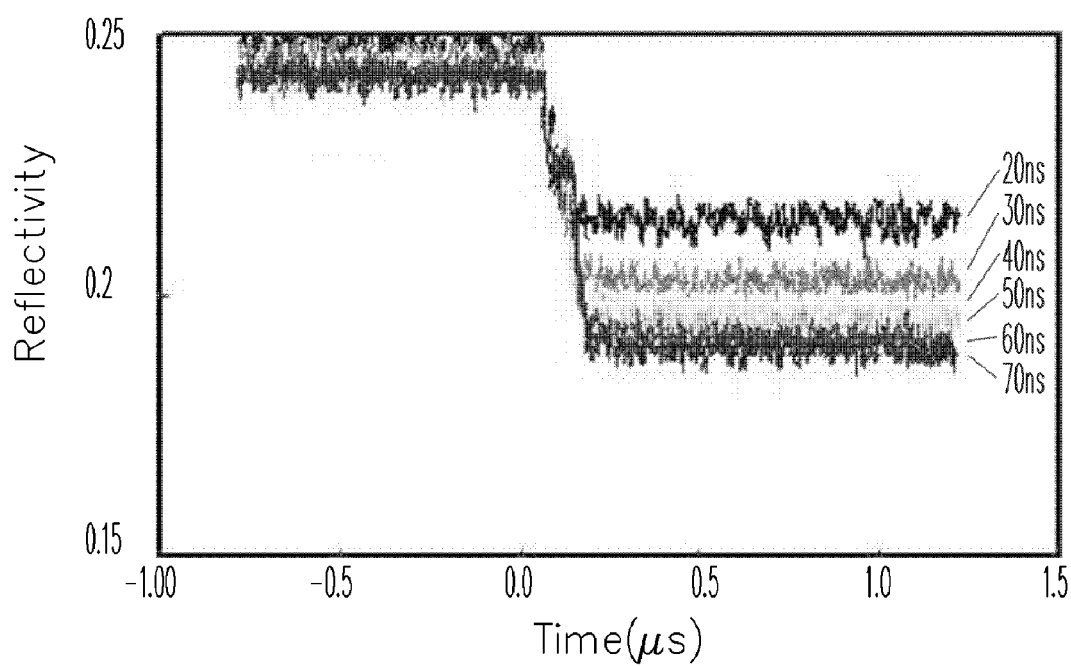
FIG. 4A is the coordinates of reflectivity verses time obtained in a disc test where the writing pulse width is in the range of 20 ns~70 ns according to experiment 1.
Figure 4B:
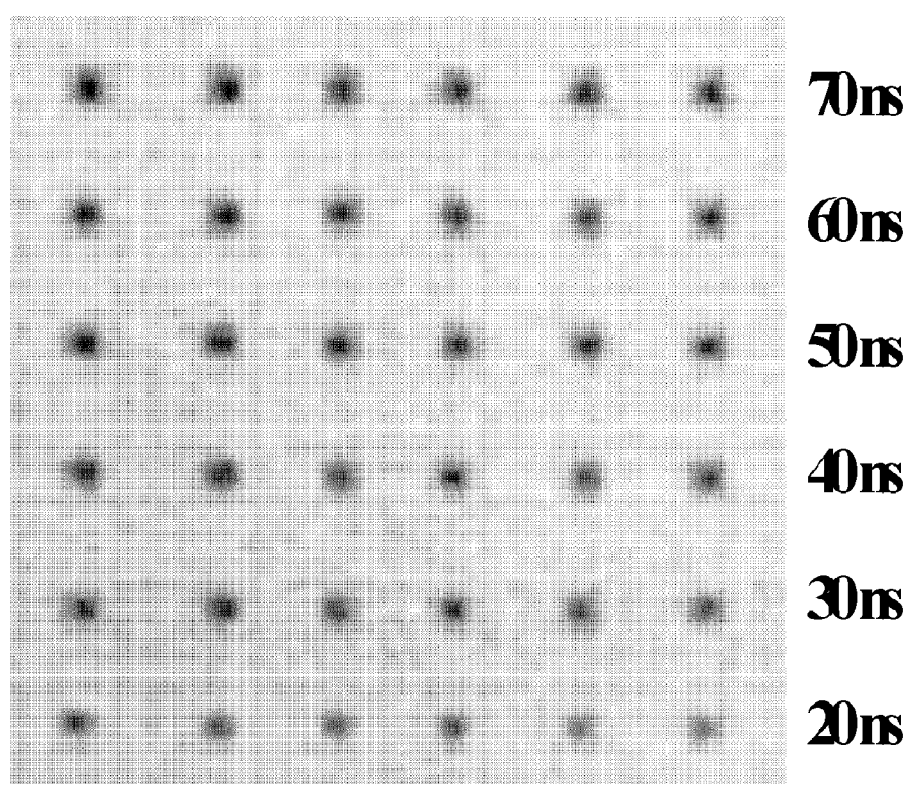
FIG. 4B is a photograph of an electric charge coupling device where the wavelength of the writing pulse is in the range of 20 ns~70 ns according to experiment 1.

FIG. 4A is the coordinates of reflectivity verses time from a disc test according to experiment 1 where the writing pulse width is in the range of 20 ns~70 ns, whereas FIG. 4B is the corresponding photograph of an electric charge coupling device. It is indicated from the test results in FIGS. 4A and 4B that a recorded mark can be written in when the material of inorganic recording layer is alloy of Si—Al, the writing power is 12 mW and the writing pulse width is above 20 ns. Thus, the recorded mark can be used for forming a WORM since the reflectivity of the recorded mark is distinguishable from the surrounding unrecorded regions.

Figure 5A:
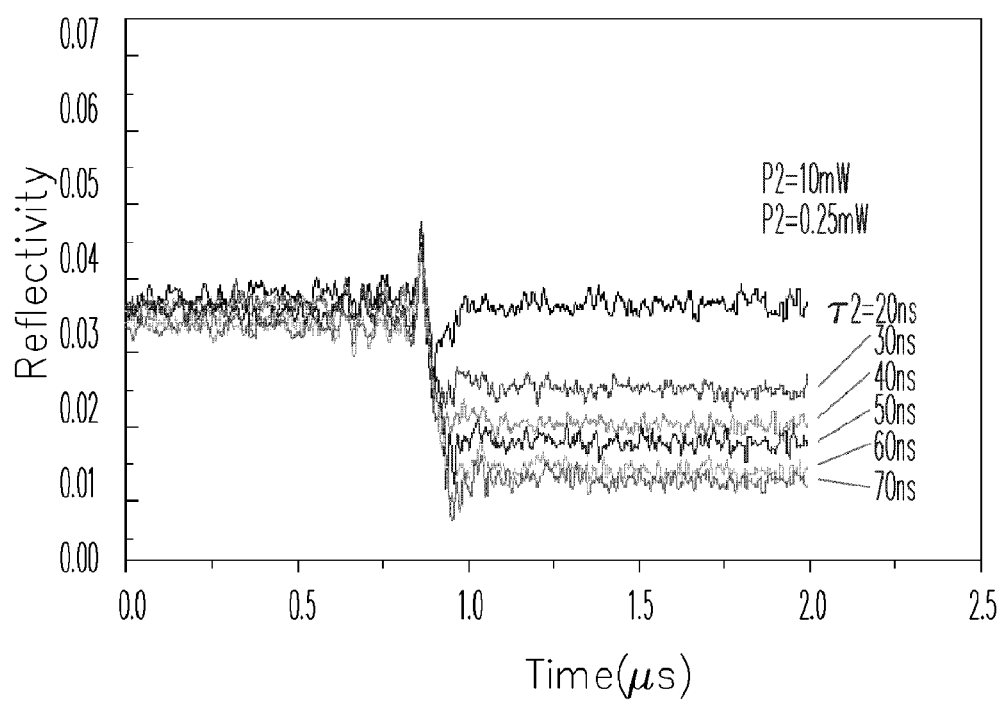
FIG. 5A is the coordinates of reflectivity verses time obtained from a disc test where the wavelength of the writing pulse is in the range of 20 ns~70 ns according to experiment 2.
Figure 5B:
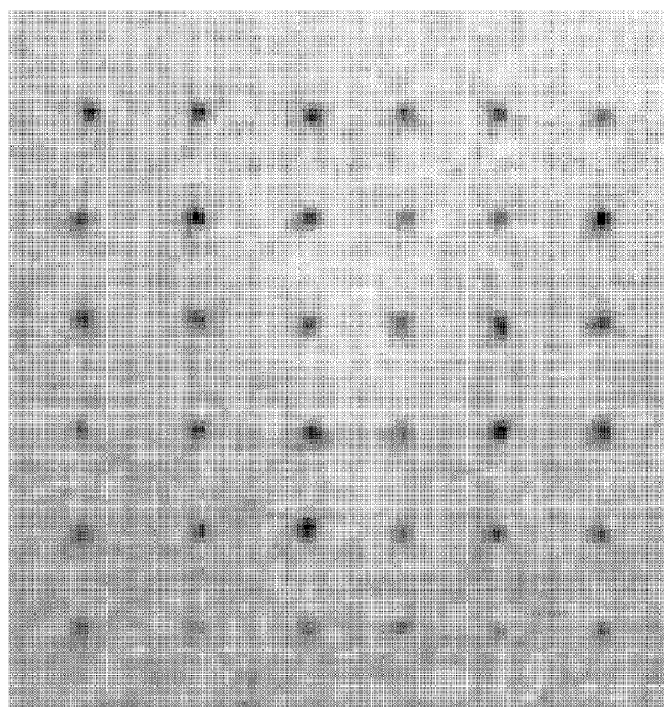
FIG. 5B is a photographic view of an electric charge coupling device where the writing pulse width is in the range of 20 ns~70 ns according to experiment 2.
Figure 6A:
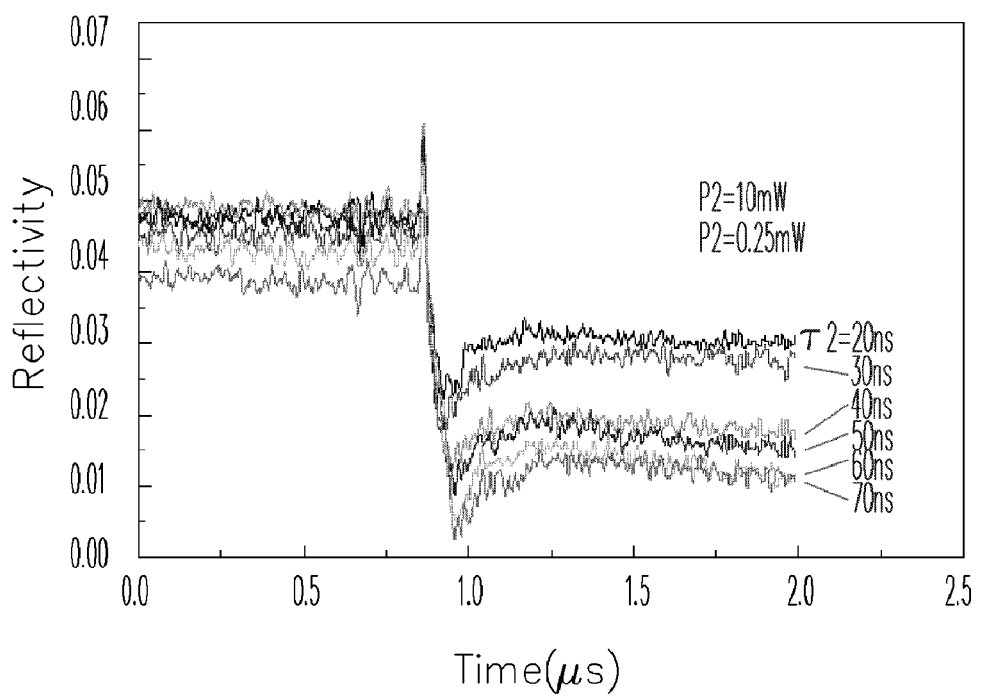
FIG. 6A is the coordinates of reflectivity verses time obtained from a disc test where the wavelength of the writing pulse is in the range of 20 ns~70 ns according to experiment 3.
Figure 6B:
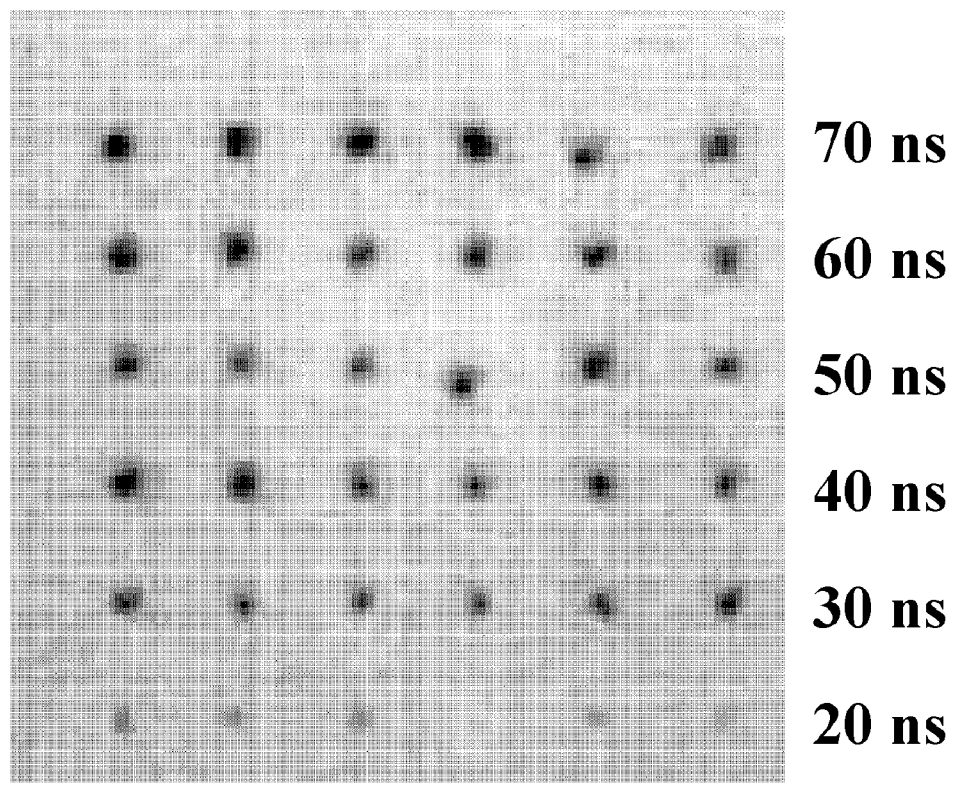
FIG. 6B is a photographic view of an electric charge coupling device where the wavelength of the writing pulse is in the range of 20 ns~70 ns according to experiment 3.

FIG. 5A is the coordinates of reflectivity verses time from a disc test according to experiment 2 where the writing pulse width is in the range of 20 ns~70 ns, whereas FIG. 5B is the corresponding photograph of an electric charge coupling device. FIG. 6A is the coordinates of reflectivity verses time from a disc test according to the experiment 3 where the writing pulse width is in the range of 20 ns~70 ns, whereas FIG. 6B is the corresponding photograph of an electric charge coupling device. It is indicated from the test results in FIGS. 5A and 5B as well as 6A and 6B that a recorded mark can be written in when the material of inorganic recording layer is alloy of Sn—Al, the writing power is 10 mW and the writing pulse width is above 30 ns. Thus, the recorded mark can be used for forming a WORM since the reflectivity of the recorded mark is distinguishable from the surrounding unrecorded regions. Moreover, according to the test results of experiments 1 and 2, when the film structure includes a sputtering reflective layer (i.e., the test disc in experiment 3), the size of a recorded mark can be controlled by appropriate amount of heat conducted through the reflective layer.

In view of the foregoing, the WORM of the present invention can steadily record information and thus is practically useful. In comparison with organic dyes, the inorganic materials, when used as recording layers in the WORM of the present invention, have advantages such as applicability in the whole spectrum of the visible light, high compatibility with respect to different types of the media, high recording density, high resolution of recorded marks, applicability to high speed, low material costs, low pollution to the environment, high light-resistance and high climate-resistance.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

The invention claimed is:

1. A write once recording medium (WORM) comprising:
a substrate;
a first protective layer on the substrate;
an inorganic recording layer on the first protective layer, wherein the inorganic recording layer, upon heating via irradiation of a laser beam, is induced to undergo a local reaction and heat absorption to form a recorded mark with distinctive reflectivity, and the inorganic recording layer is made of materials comprising those as shown in formula I:

$$A_{(1-y)}M_y \quad (I)$$

wherein A is comprised of silicon (Si) or tin (Sn); M is selected from the group consisting of aluminum (Al), silver (Ag), Gold (Au), Zinc (Zn), titanium (Ti), nickel (Ni), copper (Cu), cobalt (Co), tantalum (Ta), iron (Fe), tungsten (W), chromium (Cr), vanadium (V), gallium (Ga), lead (Pb), molybdenum (Mo), indium (In), and tellurium (Te); y is in the range of 0.02~0.8;
a second protective layer on the inorganic recording layer; and
a reflective layer on the second protective layer.

2. The WORM of claim 1, wherein the thickness of the inorganic recording layer is in the range of 3 nm~80 nm.

3. The WORM of claim 1, wherein the first protective layer and the second protective are made of a material selected from the group consisting of silicon nitride ($SiN_x$), zinc sulfide-sulfur dioxide (ZnS—$SiO_2$), aluminum nitride ($AlN_x$), silicon carbide (SiC), germanium nitride ($GeN_x$), titanium nitride ($TiN_x$), tantalum oxide ($TaO_x$), and yttrium oxide ($YO_x$).

4. The WORM of claim 1, wherein a thickness of the first protective layer and the second protective layer is in the range of 1 nm~200 nm.

5. The WORM of claim 1, wherein the first protective layer and the second protective layer comprise a single dielectric layer or a complex dielectric layer.

6. The WORM of claim 1, wherein the reflective layer is made of a material selected from the group consisting of Au, Ag, Al, Ti, Pb, Cr, Mo, W, Ta, and an alloy of the foregoing metals.

7. The WORM of claim 1, wherein a thickness of the reflective layer is in the range of 10 nm~200 nm.

8. The WORM of claim 1, further comprising a protective resin layer on the reflective layer.

9. The WORM of claim 1, wherein the protective resin layer comprises a photosetting resin.

10. The WORM of claim 1, wherein the inorganic recording layer comprises an alloy layer formed via a method of co-sputtering deposition, apple pie target sputtering deposition or alloy target sputtering deposition.

11. The WORM of claim 1, wherein the substrate comprises a substrate of CD-R, DVD-R, blue laserR, and blue laser WORM.

12. A WORM comprising:
a substrate; and
an inorganic recording layer on the first substrate wherein the inorganic recording layer, upon heating via irradiation of a laser beam, is induced to undergo a local reaction and heat absorption to form a recorded mark with distinctive reflectivity, and the inorganic recording layer is made of materials comprising those as shown in formula I:

$$A_{(1-y)}M_y \quad (I)$$

wherein A is comprised of silicon (Si) or tin (Sn); M is selected from the group consisting of aluminum (Al), silver (Ag), Gold (Au), Zinc (Zn), titanium (Ti), nickel (Ni), copper (Cu), cobalt (Co), tantalum (Ta), iron (Fe), tungsten (W), chromium (Cr), vanadium (V), gallium (Ga), lead (Pb), molybdenum (Mo), indium (In), and tellurium (Te); y is in the range of 0.02~0.8.

13. The WORM of claim 12, further comprising a first protective layer on the inorganic recording layer.

14. The WORM of claim 13, wherein the first protective layer is made of a material selected from the group consisting of silicon nitride ($SiN_x$), zinc sulfide-sulfur dioxide (ZnS—$SiO_2$), aluminum nitride ($AlN_x$), silicon carbide (SiC), germanium nitride ($GeN_x$), titanium nitride ($TiN_x$), tantalum oxide ($TaO_x$), and yttrium oxide ($YO_x$).

15. The WORM of claim 13, further comprising a reflective layer on the first protective layer.

16. The WORM of claim 13, further comprising:
a first protective layer between the inorganic recording layer and the substrate; and
a second protective layer on the inorganic recording layer.

17. The WORM of claim 16, wherein the first protective layer and the second protective are made of a material selected from the group consisting of silicon nitride ($SiN_x$), zinc sulfide-sulfur dioxide (ZnS—$SiO_2$), aluminum nitride ($AlN_x$), silicon carbide (SiC), germanium nitride ($GeN_x$), titanium nitride ($TiN_x$), tantalum oxide ($TaO_x$), and yttrium oxide ($YO_x$).

* * * * *